(12) United States Patent
Nishikawa

(10) Patent No.: US 11,093,228 B2
(45) Date of Patent: Aug. 17, 2021

(54) MANAGEMENT APPARATUS AND METHOD

(71) Applicant: CANON KABUSHIKI KAISHA, Tokyo (JP)

(72) Inventor: Satoshi Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/447,707

(22) Filed: Jun. 20, 2019

(65) Prior Publication Data

US 2020/0004521 A1    Jan. 2, 2020

(30) Foreign Application Priority Data

Jun. 28, 2018    (JP) .............................. JP2018-123694

(51) Int. Cl.
*G06F 8/61* (2018.01)
*G06F 3/12* (2006.01)
*G06F 9/46* (2006.01)

(52) U.S. Cl.
CPC ................ *G06F 8/61* (2013.01); *G06F 3/123* (2013.01); *G06F 3/1206* (2013.01); *G06F 9/46* (2013.01)

(58) Field of Classification Search
CPC .......... G06F 8/61; G06F 3/1206; G06F 3/123; G06F 9/46
See application file for complete search history.

(56) References Cited

U.S. PATENT DOCUMENTS

2014/0059534 A1* 2/2014 Daum ................ G06F 9/44505
717/172
2018/0341434 A1* 11/2018 Han ...................... G06F 3/1225

FOREIGN PATENT DOCUMENTS

JP    2011-66521 A    3/2011

OTHER PUBLICATIONS

System and Method for efficient way to reschedule cron jobs, IP.com Journal, Jan. 27, 2011, retrieved online on Apr. 15, 2021, pp. 1-7. Retrieved from the Internet: <URL: https://priorart.ip.com/IPCOM/000203512>. (Year: 2011).*

* cited by examiner

*Primary Examiner* — Hanh Thi-Minh Bui
(74) *Attorney, Agent, or Firm* — Canon U.S.A., Inc. I.P. Division

(57) ABSTRACT

A management apparatus transmits an installation instruction for installing an application to a target device according to a task created by using a template. In a case where the template used for creating the task is a template for installing the latest version of an application, an instruction for installing the latest version of the application is transmitted to the target device.

6 Claims, 18 Drawing Sheets

FIG. 6A

| TEMPLATE CREATION | | | ✕ |
|---|---|---|---|
| TEMPLATE NAME | INSTALLATION A | | |
| PRODUCT KEY | xxxxxx | ACQUIRE INFORMATION | |

| APPLICATION NAME | VERSION | ID |
|---|---|---|
| ☐ APPLICATION B | 1.0 | 1001 |
| ☐ APPLICATION B | 1.1 | 1002 |

[ NEXT ]

FIG. 6B

TEMPLATE SELECTION ✕

TEMPLATE NAME

- INSTALLED TEMPLATE A ▼
- INSTALLED TEMPLATE B
- INSTALLED TEMPLATE C

[ NEXT ]

FIG. 6C

| | DEVICE NAME | HOST NAME | IP ADDRESS | SERIAL NUMBER |
|---|---|---|---|---|
| ☐ | iR 2200 | canon21 | 192.168.10.87 | 18993354 |
| ☐ | iR 2300 | canon31 | 192.168.10.100 | 18993344 |
| ☐ | iR 2800 | canon44 | 192.168.10.110 | 189933643 |

DEVICE SELECTION

SELECT ALL | CLEAR ALL

NEXT

FIG. 6D

SCHEDULE SETTING

SCHEDULE
● EXECUTE IMMEDIATELY
○ EXECUTE AT DESIGNATED DATE AND TIME
○ EXECUTE REGULARLY

RETURN | NEXT

*FIG. 8*

| TEMPLATE CREATION | ✕ |

TEMPLATE NAME  INSTALLATION A
PRODUCT KEY  1234567   ACQUIRE INFORMATION

APPLICATION NAME    VERSION         ID
☐ APPLICATION A      1.0            0001
■ APPLICATION A      LATEST VERSION

NEXT

FIG. 9A

CONFIRMATION  ✕

DO YOU WANT TO HOLD APPLICATION VERSION IN LATEST STATE?

YES (Y)   NO (N)

FIG. 9B

SCHEDULE SETTING  ✕

SCHEDULE
○ EXECUTE IMMEDIATELY
○ EXECUTE AT DESIGNATED DATE AND TIME
● EXECUTE REGULARLY

AT 00 ON FIRST DAY OF EVERY MONTH

RETURN   NEXT

MANAGEMENT APPARATUS AND METHOD

BACKGROUND

Field

The present disclosure relates to a technique for managing network devices, including an image processing apparatus, via a network.

Description of the Related Art

Typically, a system has been known, which includes a management apparatus configured to execute device management software for acquiring and managing data such as operation information on an image formation apparatus (hereinafter referred to as a "network device"), such as a printer or a multifunction apparatus, connected to a network. In light of the increase in network devices that are management targets, and a desire for management server cost reduction, and the requirements of management server maintenance, the number of network devices managed by a single management apparatus has increased. In the management apparatus, an application is distributed to the network device, such that an application installation instruction can be provided to the network device. The application and a necessary license can be transmitted together, such that installation processing can be executed in the network device.

In a case where a user (e.g., a network administrator) of the management apparatus desires to perform some kind of process for the network device, the user creates a task designating settings such as management contents, the date and time for actually performing processing, and a network device as a processing target in advance. When the designated date and time come, the task is automatically executed, and the processing according to the settings is implemented. Distribution of the application to the network device by the management apparatus can be implemented by such task execution.

For example, Japanese Patent Laid-Open No. 2011-66521 discloses a software management apparatus configured to transmit, according to a software installation request for an image formation apparatus designated by a user, a request for installing software as an installation target in the designated image formation apparatus. The software management apparatus acquires dependence information corresponding to the software as the installation target from a software distribution server, and transmits, to the designated image formation apparatus, a request for installing not only the software as the installation target but also dependent software.

Device management software executed by the management apparatus has a mechanism for saving and managing management contents to be set for a task as a template before a task is created in the management apparatus. In the management apparatus, the templates are first generated according to user's input. Thereafter, any of these templates is called, and an execution schedule and a target device are designated. Thus, the task can be generated. In a case where an attempt is made to create the task at different schedules for each network device or each network device group, the templates are prepared so that an advantage is provided in that that a user's process is simplified.

Meanwhile, a template including an application associated with a product key input by the user and the version of such an application is created and saved in advance. Thus, in a case where a task is created using such a template, a problem can arise in that an application version different from that intended by the user, specifically a non-latest version of the application, might be installed in the target device at, for example, task creation timing or task execution timing.

SUMMARY

According to an aspect of the present disclosure, a management apparatus executes a task for distributing an application to a network device and installing the application in the network device. And the management apparatus creates a template that designates information relating to the application, creates a task that designates a schedule and a target device, by using the created template, saves the created task, and, in a case where the saved task is executed according to the schedule designated by the saved task, transmits, to the target device designated by the saved task, an installation instruction for installing the application corresponding to the information designated by the created template. In a case where the created template is a template for installing a latest version of the application, an installation instruction for installing the latest version of the application is transmitted in the transmitting, and, in a case where the created template is a template for installing a designated version of the application, an installation instruction for installing the designated version of the application is transmitted in the transmitting.

Further features will become apparent from the following description of exemplary embodiments (with reference to the attached drawings).

BRIEF DESCRIPTION OF THE DRAWINGS

FIGS. 6A to 6D illustrate examples of screens provided by the device management server according to one embodiment.

FIG. 8 illustrates an example of a screen provided by the device management server according to one embodiment.

FIGS. 9A and 9B illustrate examples of screens provided by the device management server according to one embodiment.

DESCRIPTION OF THE EMBODIMENTS

<Description of System Configuration>

Figure 1:
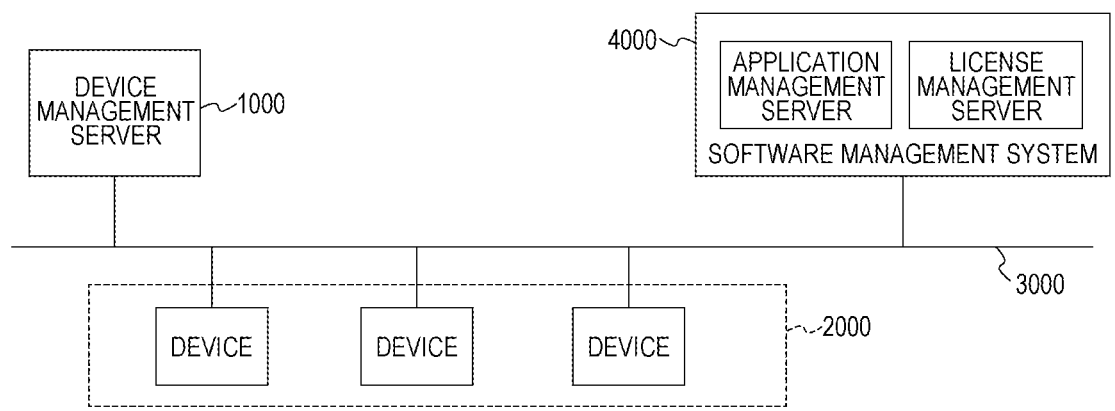
FIG. 1 is a schematic diagram illustrating a configuration of a device management system according to one embodiment of the present disclosure.

FIG. 1 is a schematic view illustrating a configuration of a device management system according to the present embodiment. The device management system includes a management apparatus (a device management server) 1000 configured to execute device management software, and multiple network devices 2000.

The network device 2000 receives print data received via a network, and performs printing on actual paper by means of a well-known print technique such as electrophotography or an ink-jet technique. Moreover, the network device 2000 also has the function of reading a paper document via a scanner to perform copying or converting the document into image data and transmitting the converted image data via, e.g., an Email. Needless to say, a printer having no copy function is also applicable. Moreover, the network device 2000 can add a new function by installing an application in the network device 2000 according to an instruction from the device management server 1000.

Figure 3:
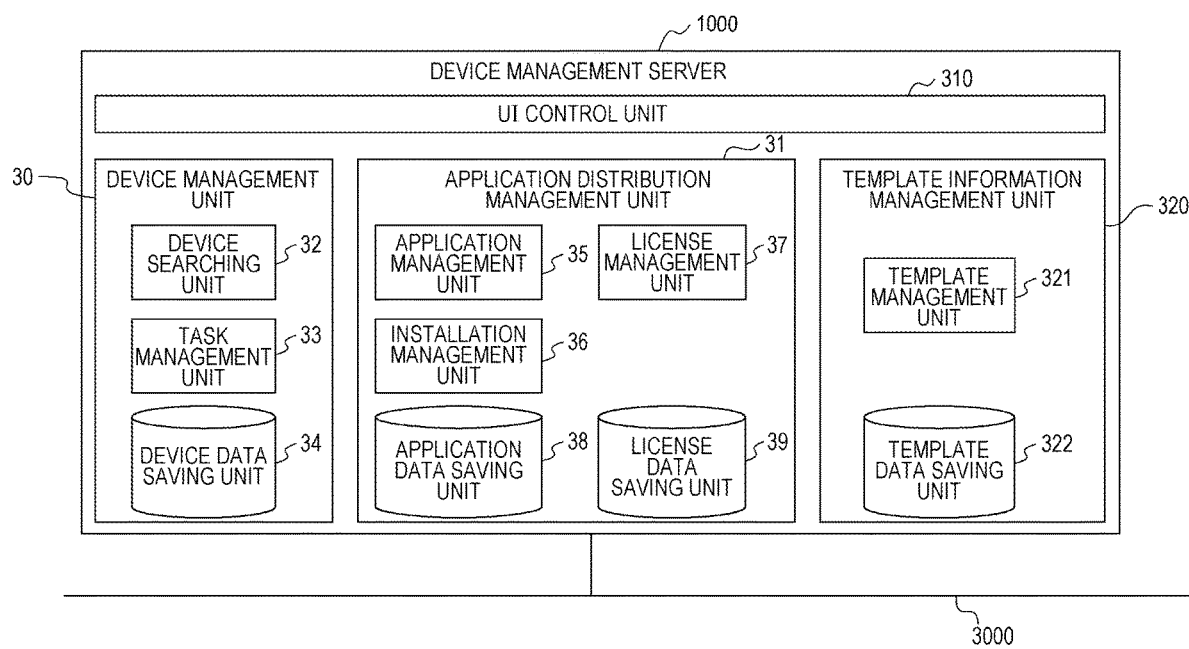
FIG. 3 is a block diagram illustrating a module configuration example of software of the device management server according to one embodiment.

The device management server 1000 and the network devices 2000 are connected to each other via a communication line 3000. The device management server 1000 described herein is a server configured to operate a device management unit 30, an application distribution management unit 31, and a UI control unit 310 implemented by execution of the device management software as illustrated in FIG. 3 for managing the network devices 2000.

A software management system 4000 is a system configured to manage software for installing an application in the network device 2000, and includes an application management server and a license management server. The software management system 4000 and the network devices 2000 are connected to each other via the communication line 3000.

For the network devices 2000, communication with each server in the software management system 4000 via, e.g., a LAN and the Internet is assumed. Note that due to failure of a setting for network environment or failure on a software management system side, the network devices 2000 and the software management system 4000 cannot communicate with each other in some cases.

<Hardware Configuration of Device Management Server>

Figure 2:
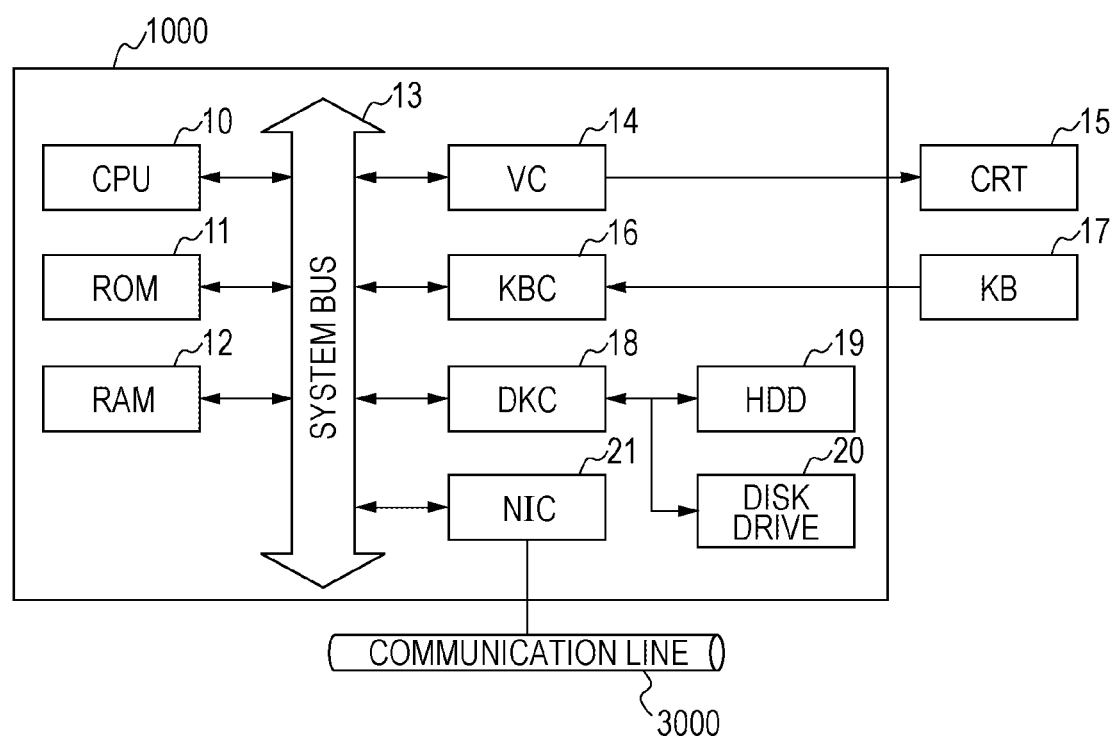
FIG. 2 is a block diagram illustrating one example of an internal configuration of an information processing apparatus forming a device management server according to one embodiment.

FIG. 2 illustrates a hardware configuration of an information processing apparatus forming the device management server 1000.

A CPU 10 uses a RAM 12 as a work area to execute various programs such as OS and the device management software stored in a ROM 11 and an HDD 19. Moreover, each configuration of the network device is connected via a system bus 13. Further, the network device includes a disk controller (DKC) 18, a disk drive 20 on which a storage medium such as a CD-ROM, a DVD, a magnetic tape, or an IC memory card is mountable, a video card (VC) 14, and a display unit using, a CRT 15. In addition, the network device includes a keyboard controller (KBC) 16, a keyboard (KB) 17, and a pointing network device (not shown) such as a mouse. The network device performs data communication with equipment on the communication line 3000 via a network interface board (NIC) 21.

<Software Configuration of Device Management Server>

FIG. 3 is a module configuration example of software of the device management unit 30, the application distribution management unit 31, the UI control unit 310, and a template information management unit 320 operating on the device management server 1000. These module configurations are implemented in such a manner that the CPU 10 executes the device management software, and perform a key role in later-described processing.

The device management unit 30 includes a network device searching unit 32, a task management unit 33, and a device data saving unit 34. The application distribution management unit 31 includes an application management unit 35, an installation management unit 36, a license management unit 37, an application data saving unit 38, and a license data saving unit 39. The template information management unit 320 includes a template management unit 321 configured to create a template, and a template data saving unit 322 configured to save the created template.

The UI control unit 310 is responsible for display unit control for the device management unit 30, the application distribution management unit 31, and the template information management unit 320. Moreover, the UI control unit 310 can be also implemented as a web-based application, and in this case, can be utilized via a web browser.

The task management unit 33 creates various tasks to save the tasks in the device data saving unit 34. Moreover, the task management unit 33 also has the control function of providing an execution request to the network device searching unit 32 or the installation management unit 36 according to schedules of the saved tasks. Task creation can be executed by the network device searching unit 32 or the installation management unit 36.

One example of the task executed by the network device searching unit 32 is network device searching for the image formation apparatus 2000 according to SNMP, IP Broadcast, SLP/Multicast, etc. In this case, the network device searching unit 32 performs searching for the image formation apparatus 2000 at optional timing. The network device searching unit 32 has the function of acquiring/changing network device information such as management information base (MIB) via the communication line 3000 such as the LAN. Moreover, the network device searching unit 32 acquires, as a network device searching result, network device information such as a network device name, a product name, and an address, thereby saving such information in the device data saving unit 34.

The device data saving unit 34 described herein is a data recording medium such as database operating on the HDD 19, and table data such as a network device list is saved therein.

The application management unit 35 manages information and an application acquired from the software management system, and saves the information and the application in the application data saving unit 38. The installation management unit 36 executes, in response to an installation instruction, creation and processing of a command for installing an application in the network device.

The license management unit 37 manages information and a license acquired from the software management system, and saves the information and the license in the license data saving unit 39.

<Software Configuration of Network Device>

Figure 4:
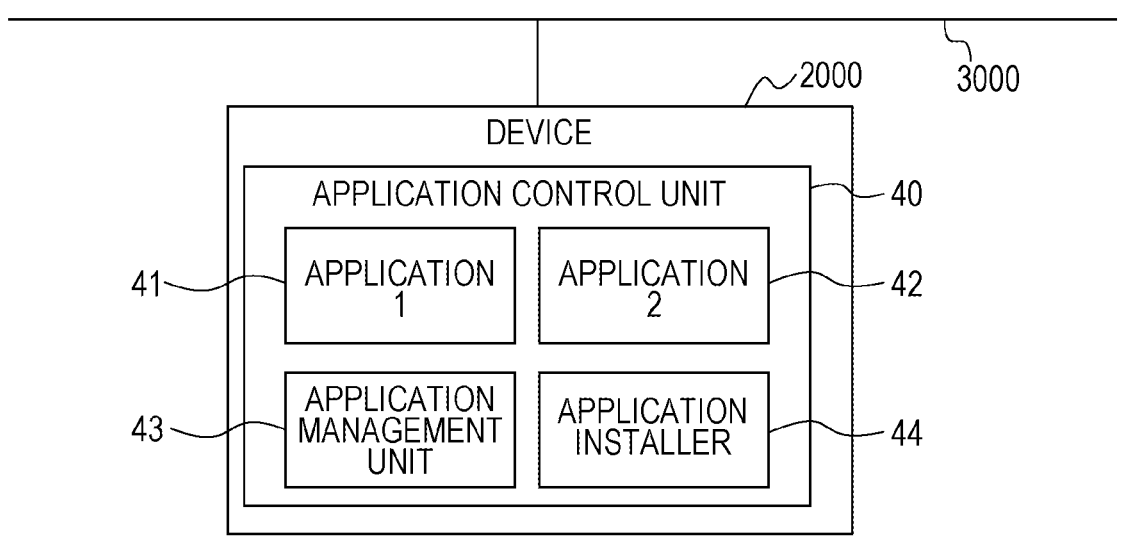
FIG. 4 is a block diagram illustrating one example of an internal configuration of a network device according to one embodiment.

FIG. 4 is a software configuration example of an application control unit 40 operating on the network device 2000.

The network device 2000 has, as a software module, an application management unit 43 configured to dynamically manage multiple installable application groups. Applications 41, 42 implementing various functions operate under the control of the application management unit 43. An application module for providing a network device service can be operated. In response to incorporation of an application into the network device by an application installer 44, the application management unit 43 adds the applications 41, 42 as management targets. Further, in response to deletion of an application program from the network device, the application management unit 43 can eliminate the applications 41, 42 from the management targets.

An application provides various functions to a user in cooperation with the network device. Examples of such an application include an application for performing processing and compression of an image, an application for performing department management such as print restriction, and a plug-in module incorporated as part of an application. Other examples include an application for performing remote management of the network device, an application for controlling a unit such as a finisher of the network device to perform bookbinding, and a conversion/analysis application for specific document data. Still other examples include a document creation program such as so-called word processor software, a schedule management program, a spreadsheet program, a database management program, and a server program for implementing a print service via the Internet.

<Application Installation Sequence>

Figure 5A:
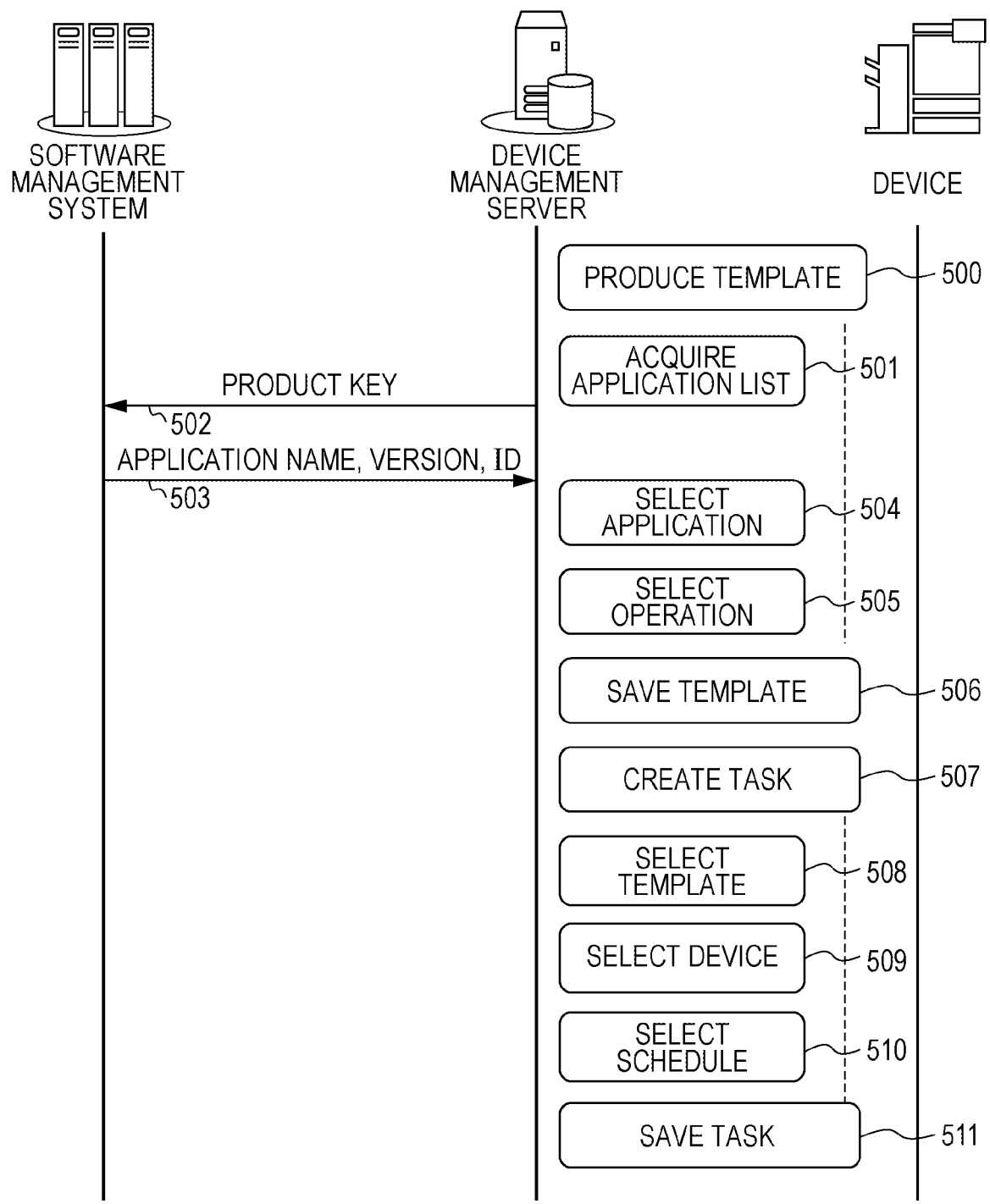
FIGS. 5A and 5B illustrate a basic sequence of entire application installation processing according to one embodiment.
Figure 5B:
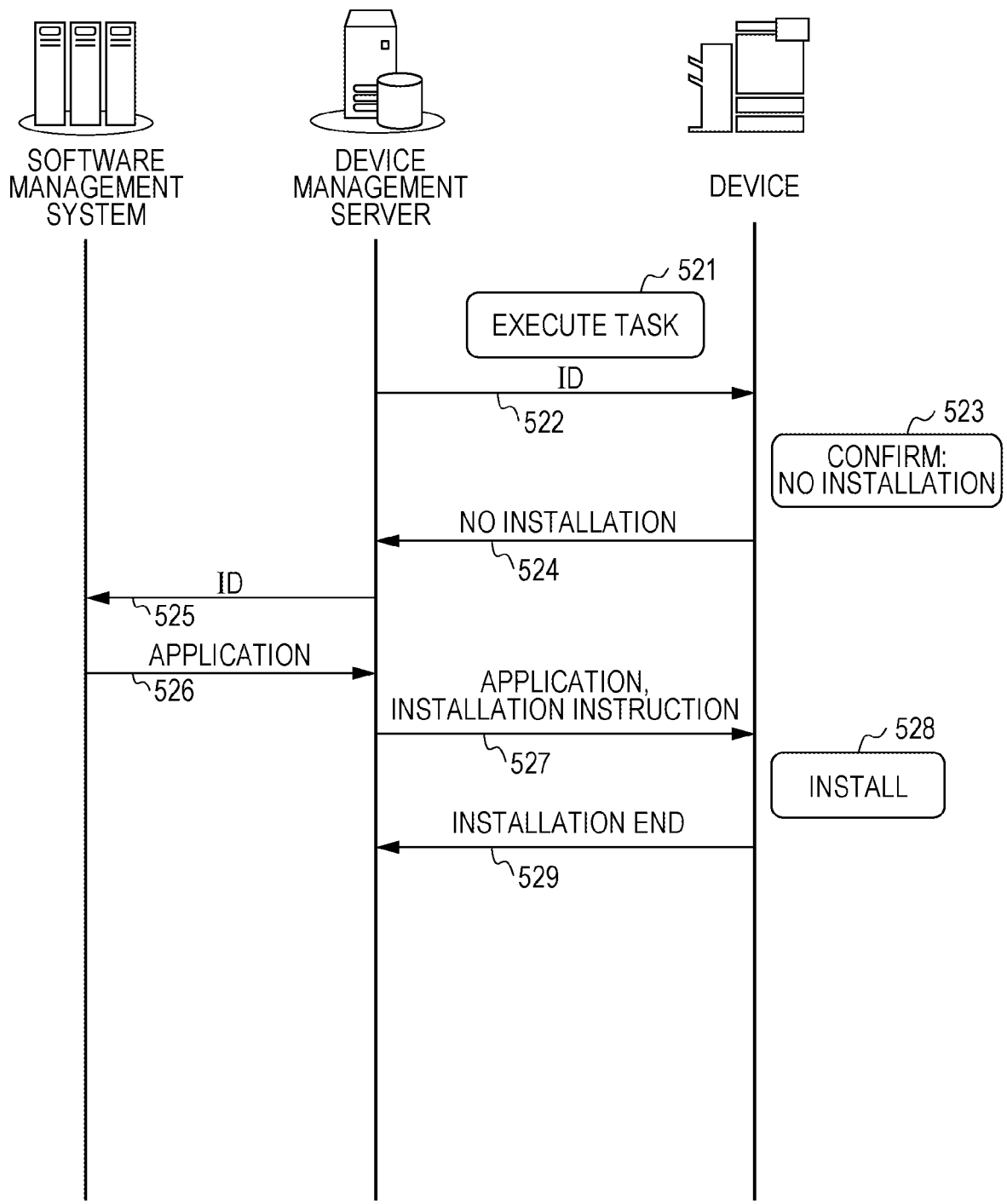

FIGS. 5A and 5B illustrate a basic sequence of entire application installation processing.

In the software management system, registration of an application that can be provided to the network device is performed as needed. An application and information such as the name, version, and identifier (hereinafter referred to as an "ID") of the application are registered. For an application product, a product key and the application are associated with each other.

In a case where it is assumed that an application is installed in the network device as a management target from the device management server, template creation 500 is first performed according to a user's instruction. An example of a template creation screen is illustrated in FIG. 6A. The template is an instruction summarizing contents to be processed in execution of a later-created task. Then, application list acquisition 501 is performed. This is the processing of inputting a product key via the screen illustrated in FIG. 6A, performing transmission 502 of the product key to the software management system, acquiring application name, version, and ID, and displaying such information on the display unit. In a case where there are multiple applications associated with the product key, information on multiple applications is displayed. The user performs selection 504 of the application/version to be installed from these applications. Next, selection 505 of operation for the application is performed. For example, such an operation includes installation, updating, and uninstallation. Then, saving 506 of the template is performed.

Next, in the device management server, task creation 507 is performed. First, template selection 508 is performed via a screen illustrated in FIG. 6B. There is a case where multiple templates have been created in advance, and a desired application installation template is selected. Next, distribution of the application and selection 509 of the network device as an installation target are performed via a screen illustrated in FIG. 6C. Multiple network devices can be selected. Then, schedule selection 510 is performed via a screen illustrated in FIG. 6D. The date and time of execution of the task or regular execution of the task is selected. Thereafter, task saving 511 is performed.

When the scheduled date and time arrive, task execution 521 is performed. In the device management server, application ID transmission 522 and confirmation 523 of whether or not the application has been already installed in the network device are first performed for the network device. In a case where the application is not installed yet, a return value 524 indicating such a state is provided from the network device, and the device management server performs ID transmission 525 to the software management system and application acquisition 526 from the software management system. The device management server distributes the application acquired to the network device, and transmits an installation instruction 527. The network device having received the instruction performs installation 528 of such an application, and performs notification 529 of installation end to the device management server.

Subsequently, processing expanded in the device management system according to the present disclosure will be described in detail with reference to FIGS. 7 to 16. Note that as described above, each step included in FIGS. 10 to 15 for describing the processing of the device management server 1000 is processing implemented in such a manner that the CPU 10 loads and executes a program as the device management software in the RAM 12.

First Embodiment

Figure 7:
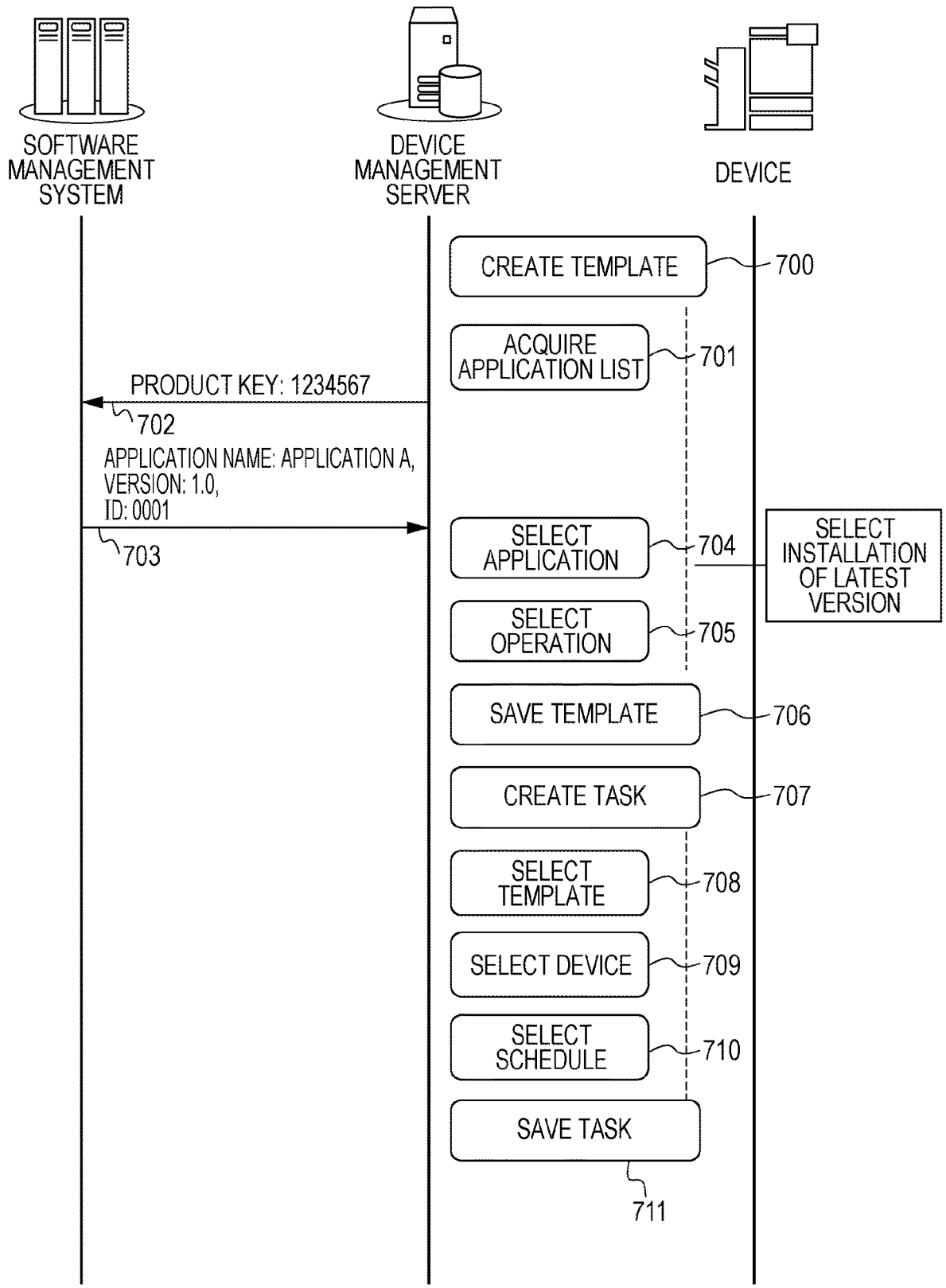
FIG. 7 illustrates a sequence expanded regarding application installation processing according to a first embodiment.
Figure 10:
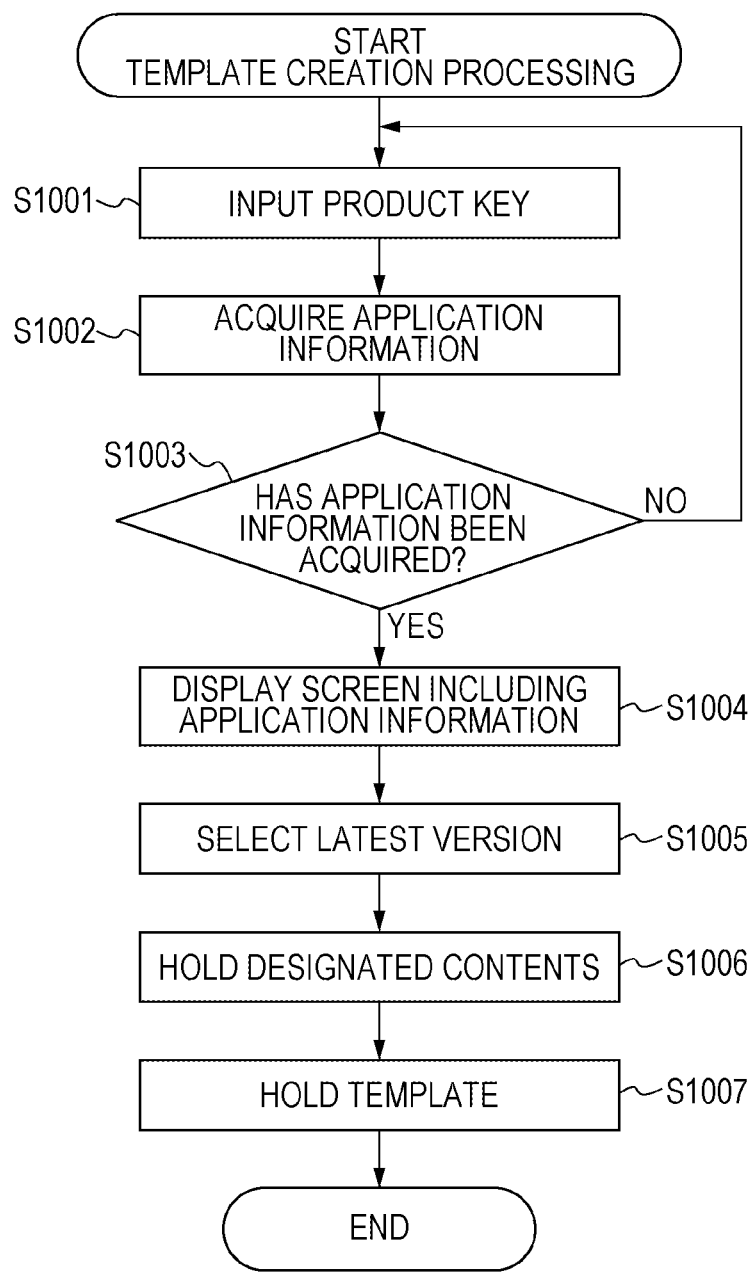
FIG. 10 is a flowchart for describing template creation processing of the device management server according to the first embodiment.
Figure 11:
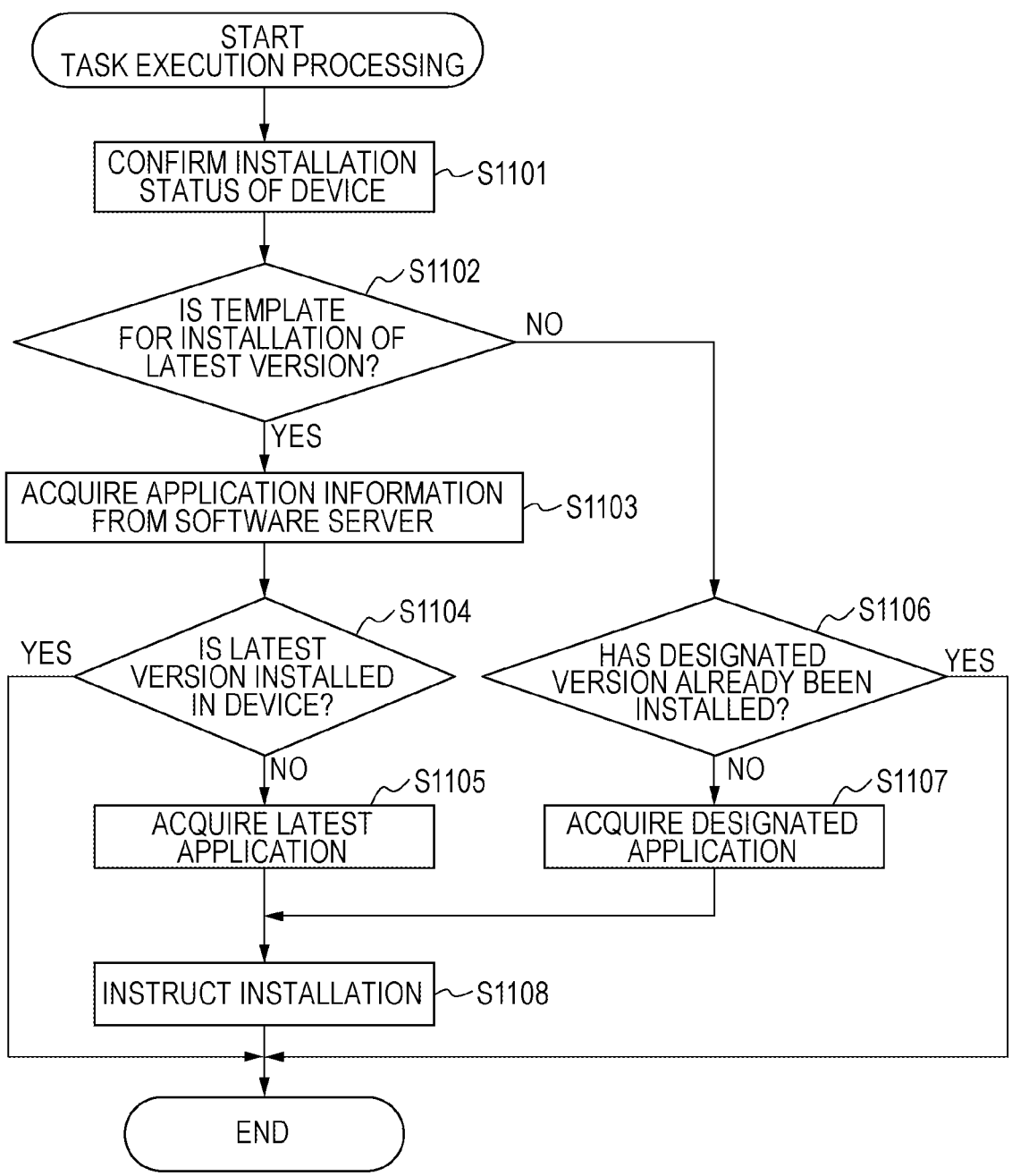
FIG. 11 is a flowchart for describing task execution processing of the device management server according to the first embodiment.

FIG. 7 is a sequence of one operation case in the present embodiment. Description of the processing illustrated in FIGS. 10 and 11 is supplemented using the sequence of FIG. 7.

First, template creation processing in the device management server 1000 will be described with reference to a flowchart illustrated in FIG. 10. Description of the present processing is supplemented using the operation case illustrated in FIG. 7.

At S1001, the template management unit 321 receives a product key input from the user via the template creation screen displayed by the UI control unit 310, and determines a product key for an application to be installed. At S1002, the template management unit 321 transmits the input product key to the software management system, and acquires application information including an application ID. At S1003, the template management unit 321 determines whether or not the application information has been acquired at S1002. If application information associated with the appropriate product key is registered in the software management system, the application information is acquired, and the processing proceeds to S1004. If not registered, an indication of no registration is displayed, and the processing returns to product key input S1001.

At S1004, the UI control unit 310 additionally displays, as illustrated in FIG. 8, the application information acquired on the template creation screen. In FIG. 8, a screen allowing identification of the latest version of the application is provided. At S1005, the template management unit 321 receives user selection via the template creation screen. Selection of the latest version of the application is received.

At S1006, the application information on the selected application is held. The application information includes, for example, an application name, version information, and an application ID. In a case where the latest version of the application is selected, the product key input at S1001 is also held for re-acquiring the application information from the software management system in task execution. Then, at S1007, the template management unit 321 saves, as a template, the information held at S1006 in the HDD 19.

In the device management server 1000, the saved template is called, and a task is created. The task is executed according to a schedule designated in task creation.

Next, task execution processing in the device management server 1000 will be described with reference to a flowchart illustrated in FIG. 11.

At S1101, the installation management unit 36 communicates with the network device to confirm an application installation status of the network device. It is confirmed whether or not an application corresponding to an ID included in application information set for a template acquired from the template data saving unit 322 and utilized in task creation has been installed.

At S1102, the installation management unit 36 determines whether or not the template is for installing the latest version of the application. In a case where the template is for installing the latest version of the application, the processing proceeds to S1103. In a case where the template is not for installing the latest version of the application, i.e., for installing a designated version of the application as usual, the processing proceeds to S1106.

At S1103, the installation management unit 36 transmits the product key saved as the template to the software management system, and acquires the application information. Accordingly, information on the latest version of the application at the point of task execution can be identified.

At S1104, the installation management unit 36 compares the information acquired at S1101 and indicating the application installed in the network device and the information acquired at S1103 and indicating the latest version of the application. As a result of comparison, it is determined whether or not the latest version of the application has been already installed in the network device. In a case where the latest version of the application has been already installed, installation processing is skipped, and the task execution processing ends. In a case where the latest version of the application is not installed yet, the processing proceeds to S1105. At S1105, the installation management unit 36 designates the application ID from the software management system to acquire the latest version of the application, and saves such an application in the application data saving unit 38.

At S1106, the installation management unit 36 compares the information acquired at S1101 and indicating the application installed in the network device and the information on the application version designated by the template. As a result of comparison, it is determined whether or not the designated version of the application has been already installed in the network device. In a case where the designated version of the application has been already installed in the network device, the installation processing is skipped, and the task execution processing ends. In a case where the designated version of the application is not installed yet, the processing proceeds to S1107. At S1107, the installation management unit 36 designates the application ID from the software management system to acquire the designated version of the application, and saves the application in the application data saving unit 38.

At S1108, the installation management unit 36 distributes the application saved at S1105 or S1107 to the network device as an installation target designated by a task, and transmits an instruction for installing the application.

After task execution, information such as task identification information (a task name, a task ID), task settings, a template, execution time, and an execution result (successful or failed) is saved as log information in the HDD 19.

An operation example will be supplemented with reference to the sequence of FIG. 7.

As in 500 to 511 of FIG. 5A, template creation and task execution of 700 to 711 of FIG. 7 are performed. FIG. 7 is characterized in that a special template is created in a case where selection of the latest version of the application is performed at the timing of application selection 704. Processing in a case where the template saved at this point is used to create and execute the task is as in description of S1103 to S1105 and S1108 of FIG. 11.

Second Embodiment

It is noted that an attempt is made to automatically set a schedule as a regular task in task creation, in which a template for installing the latest version of an application is designated as described in the first embodiment, to constantly hold an application of a network device in a latest state.

Figure 12:
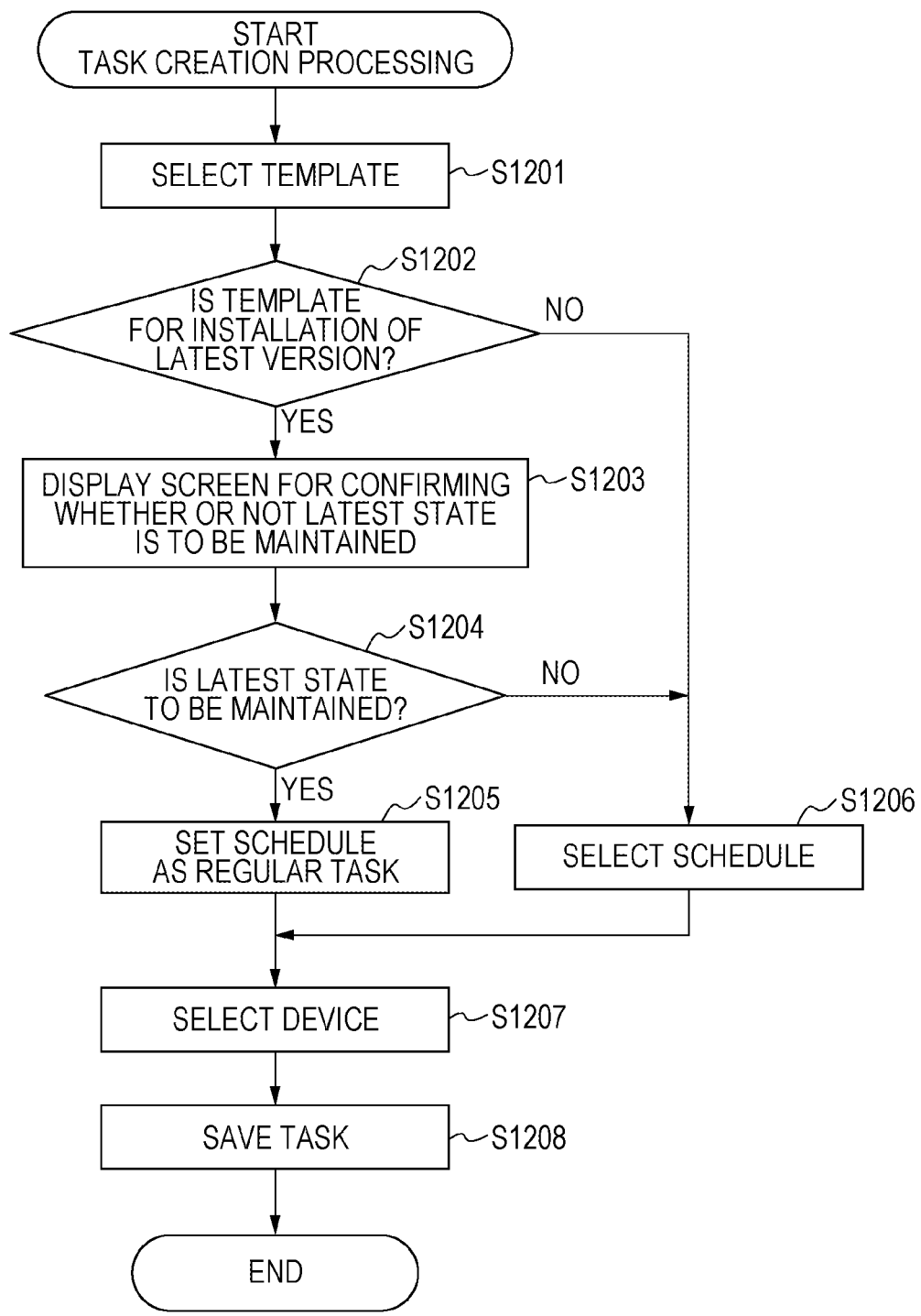
FIG. 12 is a flowchart for describing task creation processing of a device management server according to a second embodiment.

Task creation processing in a characteristic device management server 1000 of the present embodiment will be described with reference to a flowchart illustrated in FIG. 12.

At S1201, a task management unit 33 determines a template according to input from a user via a template selection screen. At S1202, the task management unit 33 determines whether or not the template selected at S1201 is the template for installing the latest version of the application. In a case where it is determined that the template is the template for installing the latest version of the application, the processing proceeds to S1203. If not, the processing proceeds to S1206.

At S1203, a UI control unit 310 displays, for the application as an installation target, a confirmation screen (FIG. 9A) on whether or not the latest state of the application is to be maintained in the network device as a distribution destination. At S1204, the task management unit 33 determines, according to input via the confirmation screen illustrated in FIG. 9A, whether or not maintaining of the latest state has been selected. In a case where it is determined that the latest state is to be maintained, the processing proceeds to S1205. If not, the processing proceeds to S1206.

At S1205, the task management unit 33 sets the schedule as a regular schedule (e.g., every week or every month). Accordingly, a regularly-scheduled execution task is created, and the processing illustrated in FIG. 11 is regularly and automatically executed for the target device.

At S1206, the UI control unit 310 displays a schedule selection screen illustrated in FIG. 9B. The user inputs a desired schedule via this screen.

At S1207, the UI control unit 310 displays a network device selection screen. The user inputs the network device as the application installation target via this screen.

At S1208, the task management unit 33 creates a task according to the selected template and the input at S1205 to S1207, and saves the task in an HDD 19.

The saved task is executed according to the designated schedule, and the processing illustrated in FIG. 11 is implemented.

Third Embodiment

It is assumed that in a case where a task created from a template for installing the latest version of an application as described in the first embodiment is, executed immediately, for example, a user having received such an execution result desires to constantly hold an application of a network device in the latest state. In the present embodiment, the processing of creating a regularly-scheduled execution task described above in the second embodiment after task execution will be described.

Task creation processing in a characteristic device management server 1000 of the present embodiment will be described with reference to a flowchart illustrated in FIG. 13. The present processing starts after completion of task execution illustrated in FIG. 1I.

At S1301, a task management unit 33 determines, from log information on an executed task, whether or not the task indicates that the latest version of the application has been installed. In a case where the task indicates that the latest version of the application has been installed, the processing proceeds to S1302. If not, the present processing ends. At S1302, the task management unit 33 determines, from the log information on the executed task, processing designated by the task has been succeeded. If succeeded, the processing proceeds to S1303. If failed, the present processing ends.

At S1303, a UI control unit 310 displays a confirmation screen (FIG. 9A) on whether or not the latest state is to be maintained in a network device as a distribution destination. At S1304, the task management unit 33 determines, according to input via the confirmation screen illustrated in FIG. 9A, whether or not maintaining of the latest state has been selected. In a case where it is determined that the latest state is to be maintained, the processing proceeds to S1305. If not, the present processing ends.

At S1305, the task management unit 33 creates a regularly-scheduled execution task for setting a schedule as a regular schedule (e.g., every week or every month), and saves the regularly-scheduled execution task in an HDD 19. Note that settings other than the schedule are according to the log information on the executed task.

Fourth Embodiment

Even in a case where a task created using a template for installing a designated version of an application is executed in the first embodiment, an attempt might be made afterward to constantly hold an application of a network device in the latest state. In the present embodiment, the processing of creating a regularly-scheduled execution task described above in the second embodiment in task execution or after task execution will be described.

Figure 14:
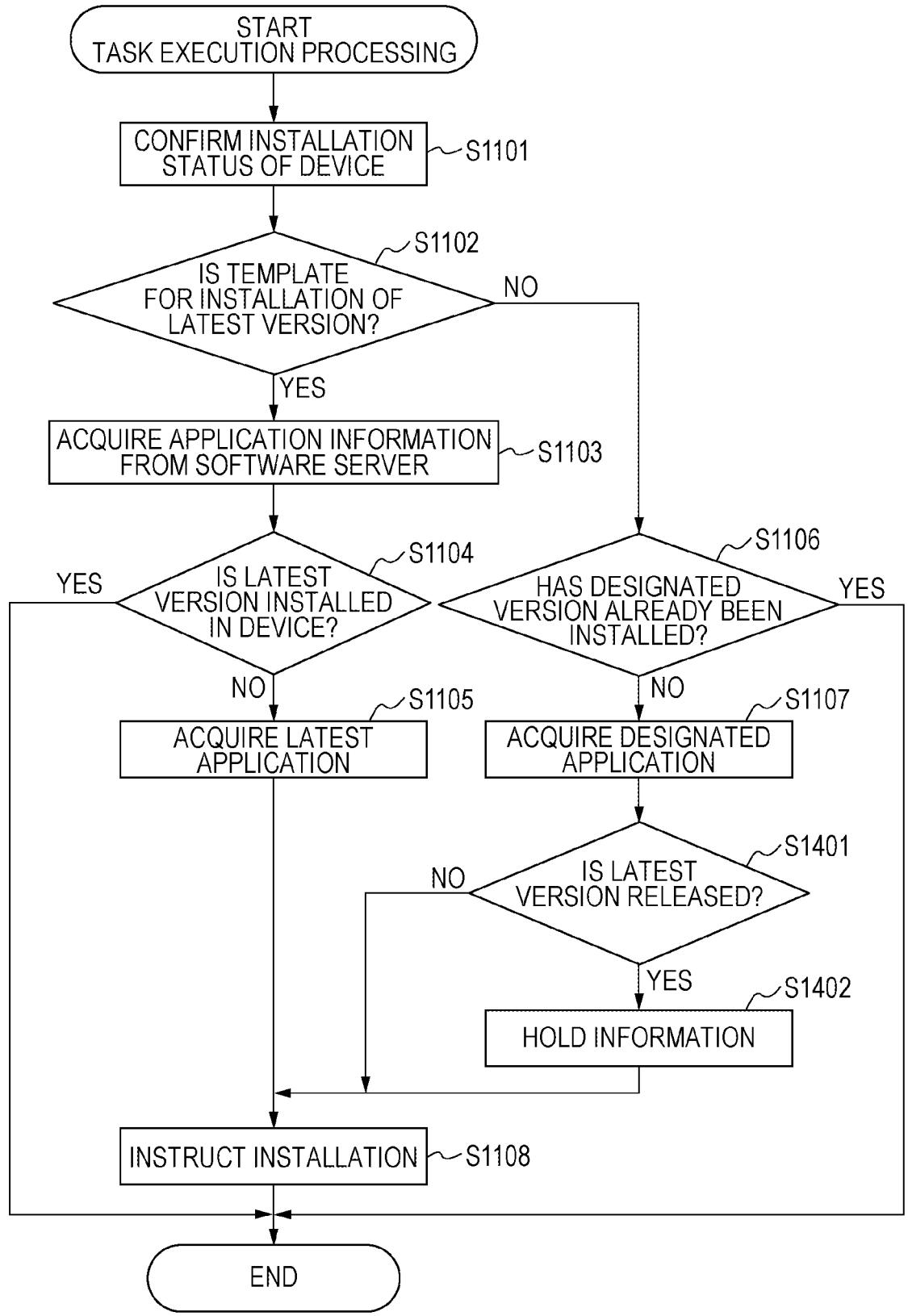
FIG. 14 is a flowchart for describing task execution processing of a device management server according to a fourth embodiment.

FIG. 14 is an expansion of the flowchart illustrated in FIG. 11. Processing different from that of FIG. 11 will be described.

Even in the case of a template for installing a designated version of an application, the product key input at S1001 of FIG. 10 described above is saved as a condition of the present embodiment.

At S1401, an installation management unit 36 transmits the product key saved as the template to a software management system, and acquires application information. Based on the acquired information, it can be determined whether or not the latest version of the application has been released at the point of task execution. In a case where it is determined that the latest version of the application is not released yet, the processing proceeds to S1108. On the other hand, in a case where it is determined that the latest version of the application has been released, an application data saving unit 38 saves, at S1402, the latest application information acquired at S1401 in an HDD 19 with the latest application information being associated with identification information (e.g., a task name and a task ID) for identifying an execution task.

Figure 15:
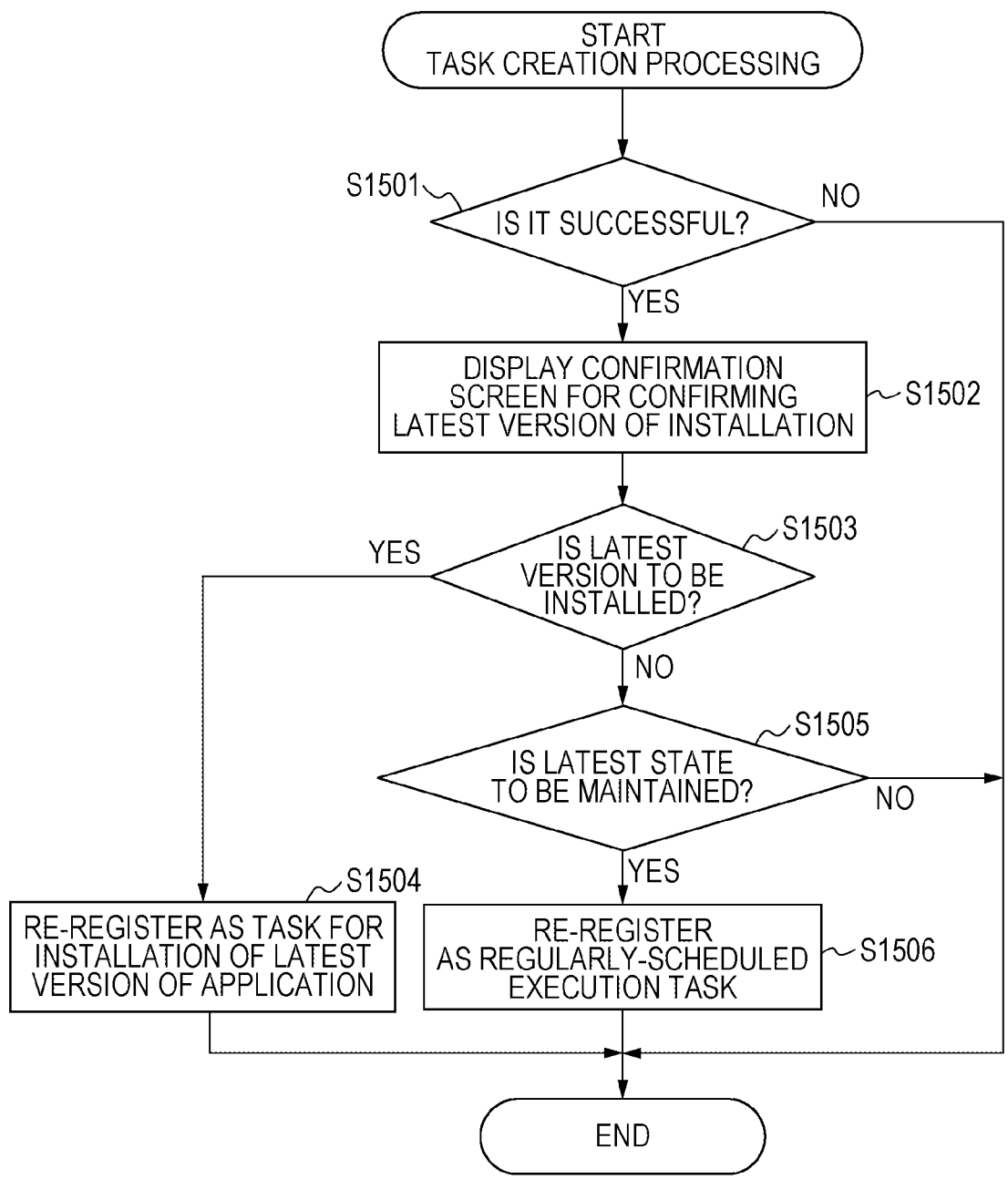
FIG. 15 is a flowchart for describing task creation processing of the device management server according to the fourth embodiment.

Task creation processing in a characteristic device management server 1000 of the present embodiment will be described with reference to a flowchart illustrated in FIG. 15. The present processing is performed after execution of the task created using the template for installing the designated version of the application as illustrated in FIG. 11 has completed.

At S1501, a task management unit 33 determines, from log information on an executed task, whether or not processing designated by the task has been succeeded. If succeeded, the processing proceeds to S1502. If failed, the present processing ends.

At S1502, a UI control unit 310 displays a screen (FIG. 16) for confirming whether or not the latest version of the application is to be installed in a network device as a distribution destination.

Figure 16:
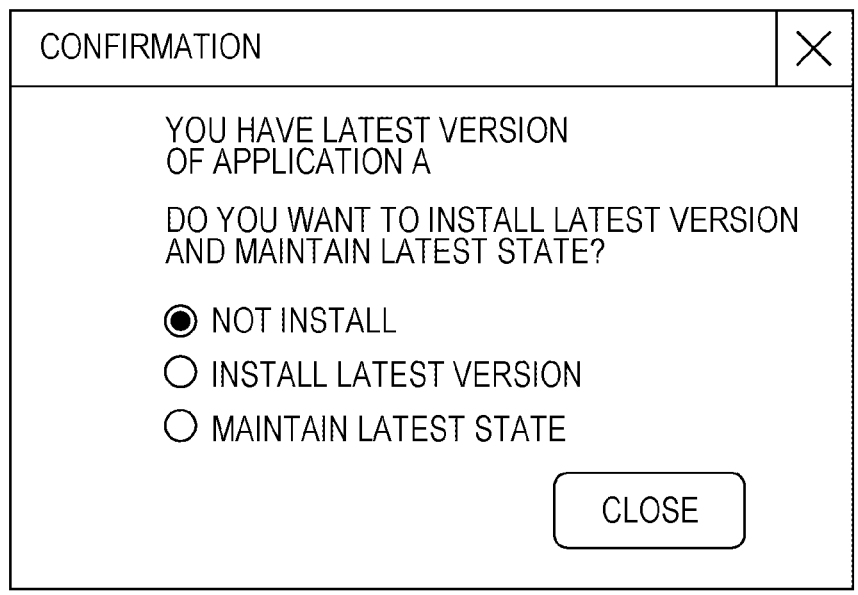
FIG. 16 illustrates an example of a screen provided by the device management server according to one embodiment.

The confirmation screen illustrated in FIG. 16 is a screen allowing selection of any of the option of not installing the latest version of the application, the option of installing the latest version of the application only once, and the option of maintaining a target application in the latest state.

At S1503 the task management unit 33 determines, according to input via the confirmation screen illustrated in FIG. 16, whether or not the option of installing the latest version of the application only once has been selected. In a case where it is determined that the option of installing the latest version of the application only once has been selected, the processing proceeds to S1504. If not, the processing proceeds to S1505.

At S1504, the task management unit 33 creates a task for setting a schedule as an immediate schedule, and saves the task in the HDD 19. Note that settings other than the schedule are according to the application information held at S1402 and the log information on the executed task. Note that in an internal configuration, a template for installing the latest version of the application is also automatically created. With the created task, the processing of S1101 to S1105 and S1108 illustrated in FIG. 11 is executed.

At S1505, the task management unit 33 determines, according to the input via the confirmation screen illustrated in FIG. 16, whether or not maintaining of the latest state has been selected. In a case where it is determined that the latest state is to be maintained, the processing proceeds to S1506. If not, the present processing ends.

At S1506, the task management unit 33 creates a regularly-scheduled execution task for setting the schedule as a regular schedule (e.g., every week or every month), and saves the regularly-scheduled execution task in the HDD 19.

Figure 13:
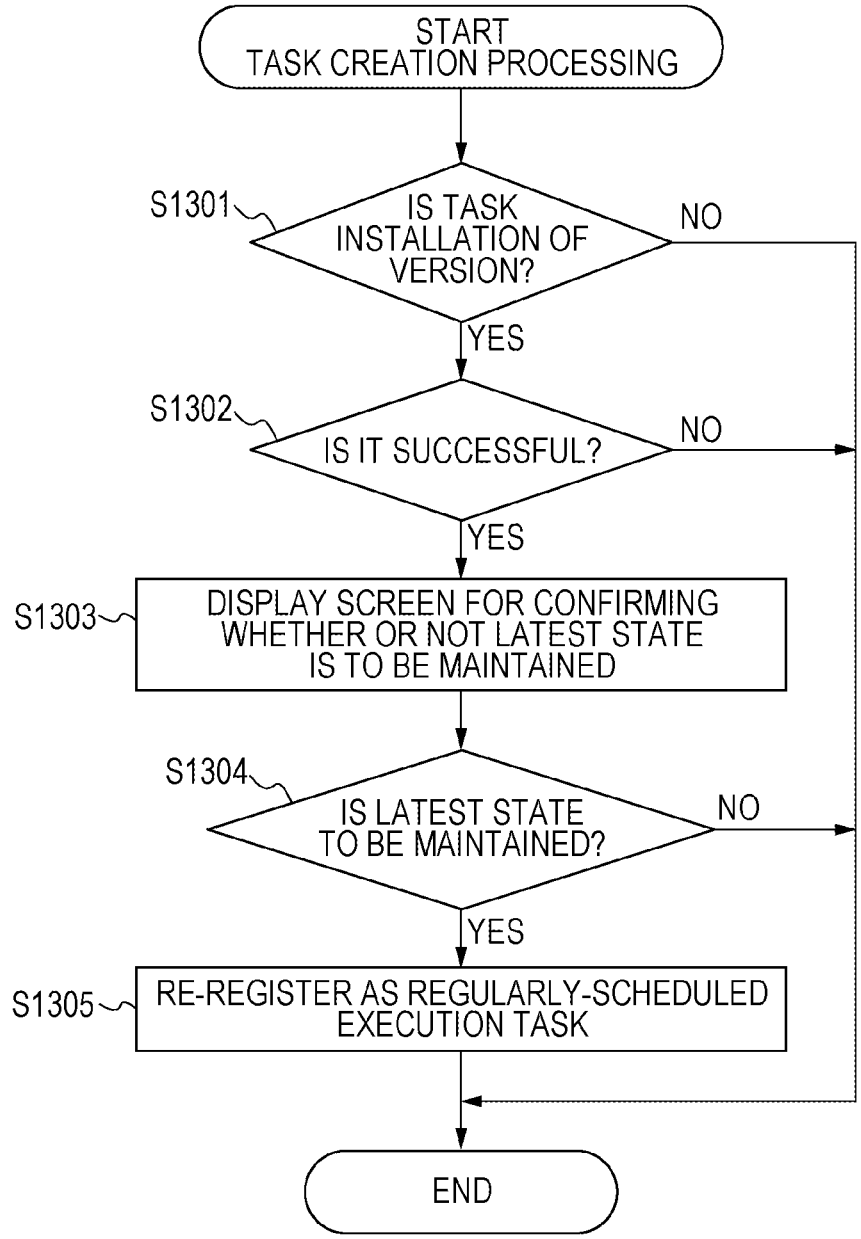
FIG. 13 is a flowchart for describing task creation processing of a device management server according to a third embodiment.

Note that settings other than the schedule are according to the log information on the executed task, and as a result, a task similar to that of S1305 of FIG. 13 is created.

Other Embodiments

Various embodiments of the present disclosure also include apparatuses, systems, or methods configured in such a manner that the above-described embodiments are combined as necessary.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-123694, filed Jun. 28, 2018, which is hereby incorporated by reference herein in its entirety.

What is claimed is:

1. A management apparatus for executing a task for distributing an application to a network device and installing the application in the network device, comprising:
one or more processors; and
one or more memories storing instructions that, when executed by the one or more processors, cause the management apparatus to:
create a template that designates information relating to the application;
create a task that designates a schedule and a target device, by using the created template;
save the created task; and in a case where the saved task is executed according to the schedule designated by the saved task, transmit, to the target device designated by the saved task, an installation instruction for installing the application corresponding to the information designated by the created template,
wherein the instructions further cause the management apparatus to provide, in a case where the template used to create the task is a template for installing a latest version of the application, a first display for confirming whether or not the application of the target device is to be maintained in a latest state,
wherein, in a case where maintaining of the application of the target device in the latest state is designated via the first display, a regularly-scheduled execution task for installing the latest version of the application in the target device is created and saved,
wherein an installation instruction for installing the latest version of the application is transmitted, to the target device designated by the saved regularly scheduled execution task, based on the saved regularly-scheduled execution task, and
wherein, in a case where maintaining of the application of the target device in the latest state is not designated via the first display, a task that designates that the schedule be executed once, for installing the latest version of the application, is created and saved.

2. The management apparatus according to claim 1, wherein in a case where the created template is a template for installing a designated version of the application, an installation instruction for installing the designated version of the application is transmitted in the transmitting.

3. The management apparatus according to claim 2, wherein the instructions further cause the management apparatus to:
determine, in a case where the task created using the template for installing the designated version of the application is executed, whether or not a latest version of the application has been released, and
after the task created using the template for installing the designated version of the application has been executed, display a second displayccrccn for confirming an installation related to the latest version of the application.

4. The management apparatus according to claim 3, wherein the instructions further cause the management apparatus to create, if it is determined, based on an instruction via the second display, that the application of the target device is to be maintained in a latest state, a task for installing the latest version of the application in the target device, wherein the created task is a regularly-scheduled execution task.

5. A method for a management apparatus to execute a task for distributing an application to a network device and installing the application in the network device, the method comprising:
creating a template that designates information related to the application;
creating a task that designates a schedule and a target device, by using the created template;
saving the created task; and
in a case where the saved task is executed according to the schedule designated by the saved task, transmitting, to the target device designated by the saved task, an installation instruction for installing the application corresponding to the information designated by the created template,
wherein the instructions further cause the management apparatus to provide, in a case where the template used to create the task is a template for installing a latest version of the application, a first display for confirming whether or not the application of the target device is to be maintained in a latest state, wherein, in a case where maintaining of the application of the target device in the latest state is designated via the first display, a regularly-scheduled execution task for installing the latest version of the application in the target device is created and saved, wherein an installation instruction for installing the latest version of the application is transmitted, to the target device designated by the saved regularly scheduled execution task, based on the saved regularly-scheduled execution task, and wherein, in a case where maintaining of the application of the target device in the latest state is not designated via the first display, a task that designates that the schedule be executed once, for installing the latest version of the application, is created and saved.

6. A non-transitory computer readable storage medium for storing a computer program that when executed causes a computer to execute a process for executing a task for distributing an application to a network device and installing the application in the network device, the process comprising:

creating a template that designates information related to the application;

creating a task that designates a schedule and a target device, by using the created template;

saving the created task; and in a case where the saved task is executed according to the schedule designated by the saved task, transmitting, to the target device designated by the saved task, an installation instruction for installing the application corresponding to the information designated by the created template, wherein the instructions further cause the management apparatus to provide, in a case where the template used to create the task is a template for installing a latest version of the application, a first display for confirming whether or not the application of the target device is to be maintained in a latest state, wherein, in a case where maintaining of the application of the target device in the latest state is designated via the first display, a regularly-scheduled execution task for installing the latest version of the application in the target device is created and saved, wherein an installation instruction for installing the latest version of the application is transmitted, to the target device designated by the saved regularly scheduled execution task, based on the saved regularly-scheduled execution task, and wherein, in a case where maintaining of the application of the target device in the latest state is not designated via the first display, a task that designates that the schedule be executed once, for installing the latest version of the application, is created and saved.

* * * * *